United States Patent [19]

Takase

[11] Patent Number: 5,539,795
[45] Date of Patent: Jul. 23, 1996

[54] SECTOR PULSE GENERATING APPARATUS FOR MULTIPLE ZONE RECORDING OF A DISK MEMORY

[75] Inventor: Yasuhiro Takase, Tokyo, Japan

[73] Assignee: NEC Corporation, Tokyo, Japan

[21] Appl. No.: 497,893

[22] Filed: Jul. 3, 1995

[30] Foreign Application Priority Data

Jul. 7, 1994 [JP] Japan .................................. 6-156130

[51] Int. Cl.$^6$ ........................... G11B 5/596; H03K 21/10
[52] U.S. Cl. ........................... 377/39; 360/51; 360/77.08; 377/56
[58] Field of Search ................................. 377/54, 39, 56; 360/48, 51, 77.08

[56] References Cited

U.S. PATENT DOCUMENTS

| | | | |
|---|---|---|---|
| 3,944,858 | 3/1976 | Pettersson | 377/39 |
| 4,079,234 | 3/1978 | Kashio | 377/39 |
| 5,048,063 | 9/1991 | Isobe et al. | 377/39 |
| 5,367,550 | 11/1994 | Ishida | 377/39 |
| 5,430,781 | 7/1995 | Miyake et al. | 377/56 |
| 5,440,474 | 8/1995 | Hetzler | 360/77.08 |

FOREIGN PATENT DOCUMENTS 4125859  4/1992  Japan .

Primary Examiner—John S. Heyman
Attorney, Agent, or Firm—Whitham, Curtis, Whitham & McGinn

[57] ABSTRACT

A sector pulse generating apparatus for multiple zone recording includes only first and second counters. The first counter counts reference clock pulses and outputs a present position signal. The second counter is incremented in response to a increment signal and outputs a next sector number signal. A first register stores the sector length of a zone in which a head is located. A multiplier outputs a next sector position signal representative of a multiplication of the next sector number and the sector length. A first comparator compares the magnitude of the present position and the next sector position. When the present position and the next sector position match, a sector pulse generating device generates a sector pulse and a first increment device outputs the increment signal.

14 Claims, 12 Drawing Sheets

| STATE | | INPUT | | | OUTPUT | | |
|---|---|---|---|---|---|---|---|
| | | 102 | 104 | 105 | 106 | 107 | 108 |
| A | | * | * | * | 0 | 0 | 1 |
| B | (B-1) | 1 | * | * | 0 | 0 | 1 |
| | (B-2) | 0 | 0 | * | 0 | 1 | 0 |
| | (B-3) | 0 | 1 | * | 0 | 0 | 0 |
| C | (C-1) | 1 | * | * | 0 | 0 | 1 |
| | (C-2) | 0 | 1 | 0 | 0 | 0 | 0 |
| | (C-3) | 0 | * | 1 | 1 | 1 | 0 |
| | (C-4) | 0 | 0 | 0 | 0 | 1 | 0 |

* = Do not care

FIG.4

SECTOR PULSE GENERATING APPARATUS FOR MULTIPLE ZONE RECORDING OF A DISK MEMORY

BACKGROUND OF THE INVENTION

The present invention relates to a sector pulse generating apparatus for a disk memory, and more particularly to a sector pulse generating apparatus for multiple zone recording of a disk memory.

A "disk memory" refers to a disk-type recording medium such as a hard disk, a flexible disk, and an optical disk. A typical disk memory has a plurality of circular tracks. Each track includes a plurality of sectors having an arc-like shape.

A "sector length" of a sector refers to an angle between segments OA and OB, where points O, A, and B are the center of the disk memory, an endpoint of the sector, and the second endpoint of the sector, respectively.

A "maximum sector number" refers to the number of sectors included in a track.

A "zone" refers to a region of the disk memory in which all tracks include the same number of sectors. All tracks in a zone have the same maximum sector number. All sectors in a zone have the same sector length.

"Multiple zone recording" refers to data recording or reproducing in which a plurality of zones having different maximum sector numbers are provided in the disk memory.

A "large zone" and a "small zone" refer to first and second zones, respectively, where the maximum sector number of the first zone is greater than that of the second zone.

An "index signal" refers to a signal indicating that the disk memory is in a predetermined position relative to a recording/reproducing head. In a typical flexible disk drive, the index signal is generated by detecting an index hole provided in the flexible disk. In a typical hard disk drive, the index signal is generated by reproducing and converting information recorded in the hard disk.

In a disk memory drive, sector pulses are generated for synchronization of data recording or reproducing.

The sector pulses occur at a regular time interval. Thus, the sector pulses can be generated by counting reference clock pulses and outputting the sector pulses every Np clock pulses. Hereinafter, the number Np is referred to as a "sector length" of a sector because Np is directly proportional to the sector length of the sector defined above.

In multiple zone recording, the reference clock counter is reset when the head is moved across a zone boundary because the sector length Np varies from zone to zone. The reference clock counter starts counting again when it receives an index signal. Thereafter, the counter operates in the same way with respect to a new sector length Np Thus, the generation of the sector pulse is deferred until the index signal arrives.

A conventional sector pulse generating apparatus for eliminating the aforementioned delay in sector pulse production is disclosed in Japanese Laid-Open Patent Publication Hei 4-125859 (1992).

Referring to FIG. 1, the conventional apparatus comprises first to n-th sector pulse generating circuits 43-1 to 43-n corresponding to first to n-th zones, respectively. The sector pulse generating circuit 43-i outputs sector pulses every Np-i reference clocks, where Np-i is the sector length of the i-th zone. Thus, the sector pulse generating circuit 43-1 to 43-n simultaneously generate the sector pulses 48-1 to 48-n of first to n-th zones, respectively.

The conventional apparatus also comprises first to n-th sector pulse counters 44-1 to 44-n counting the sector pulses 48-1 to 48-n, respectively. The count value of the sector pulse counters 44-1 to 44-n are output as signals 49-1 to 49-n, respectively. The sector pulse counters 48-1 to 48-n are reset when they receive an index signal 102.

The conventional apparatus further comprises a multiplexer 45. According to zone select signals 42-1 to 42-n indicating one of the zones, the multiplexer 45 selects one of the sector pulses 48-1 to 48-n and a corresponding one of the signals 49-1 to 49-n. The selected sector pulse and signal are output as a sector pulse signal 106 and a sector pulse count value 47.

In this apparatus, when the head is moved across a zone boundary, new sector pulses are generated immediately without waiting for the arrival of the index signal because the sector pulse generating circuits 43-1 to 43-n generate sector pulses of all zones simultaneously.

However, this apparatus needs the same number of sector pulse generating circuits as the number of zones in the disk memory. Therefore, as the number of zones increases, the size and the complexity of the apparatus increases.

SUMMARY OF THE INVENTION

In view of the aforementioned problem of the conventional sector pulse generating circuit, one object of the present invention is to provide a sector pulse generating apparatus for multiple zone recording whose size and complexity do not increase with the number of zones. More specifically, the apparatus comprises a fixed number of counters irrespective of the number of zones.

Another object of the present invention is to provide a sector pulse generating apparatus that generates sector pulses immediately after the head is moved across a zone boundary.

Yet another object of the present invention is to provide a sector pulse generating apparatus that automatically adjusts the value of the counters after the head movement across a zone boundary.

According to the present invention, a sector pulse generating apparatus for multiple zone recording receives reference clock pulses and outputs a sector pulse. The apparatus comprises first and second counters, a first register, a multiplier, a first comparator, first increment means and sector pulse generating means. The first counter receives and counts the reference clock pulses. The first counter outputs a first signal representing a first count value thereof. The second counter receives an increment signal and is incremented in response to the increment signal. The second counter outputs a second signal representing a second count value thereof. The first register stores a first number and outputs a third signal representing the first number. The multiplier receives the second and third signals and outputs a fourth signal representative of a multiplication of numbers represented by the second and third signals. The first comparator outputs a fifth signal according to a comparison of a magnitude of numbers represented by the first and fourth signals. The first increment means receives the fifth signal and outputs the increment signal when the fifth signal represents that numbers represented by the first and fourth signals match. The sector pulse generating means receives the fifth signal and outputs the sector pulse when the fifth signal represents that numbers represented by the first and fourth signals match.

The apparatus may comprise adjustment means for adjusting the second count value of the second counter. The adjustment means comprises second increment means. The second increment means receives the fifth signal and outputs the increment signal continuously while the fifth signal indicates that a number represented by the first signal is greater than a number represented by the fourth signal. The adjustment means may comprise first suspension means. The first suspension means suspends a generation of the sector pulse until the index signal is output. The adjustment means comprises second suspension means. The second suspension means suspends a generation of the sector pulse until the fifth signal represents that numbers represented by the first and fourth signals match.

In the apparatus, a number of the first and second counters remains fixed irrespective of a number of zones of the multiple zone recording. Therefore, as a number of zones of the multiple zone recording increases, a structure of the sector pulse generating means remains fixed.

BRIEF DESCRIPTION OF THE DRAWINGS

Other objects, features and advantages of the present invention will become more apparent when the following description is read in conjunction with the accompanying drawings, wherein:

FIG. 4 shows the relationship between the input and the output of the sequential circuit 8.

In these drawings, the same reference numerals depict the same parts, respectively.

DETAILED DESCRIPTION OF THE PREFERRED EMBODIMENTS

Figure 1:
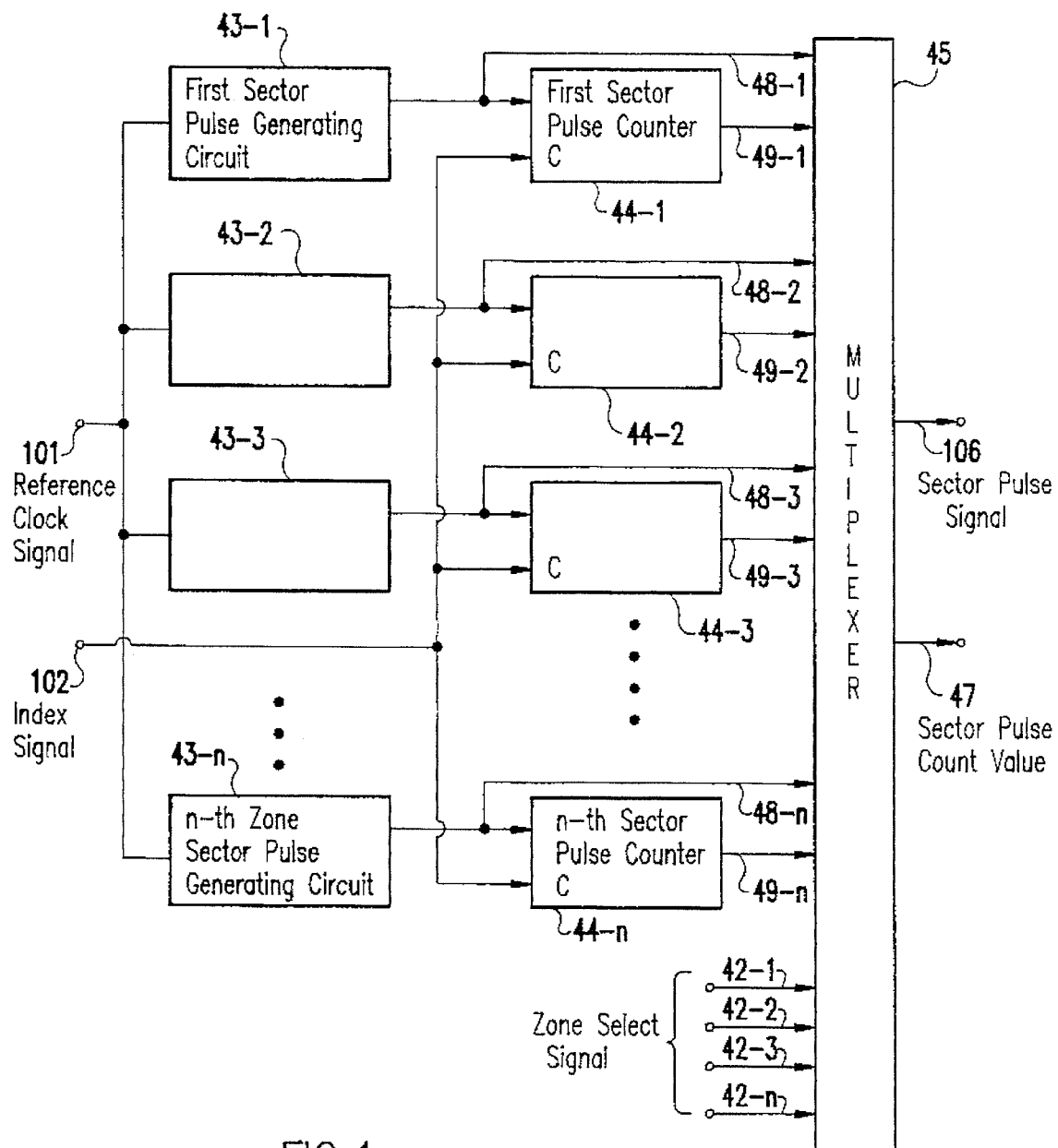
FIG. 1 is a block diagram of a conventional sector pulse generating apparatus for multiple zone recording.
Figure 2:
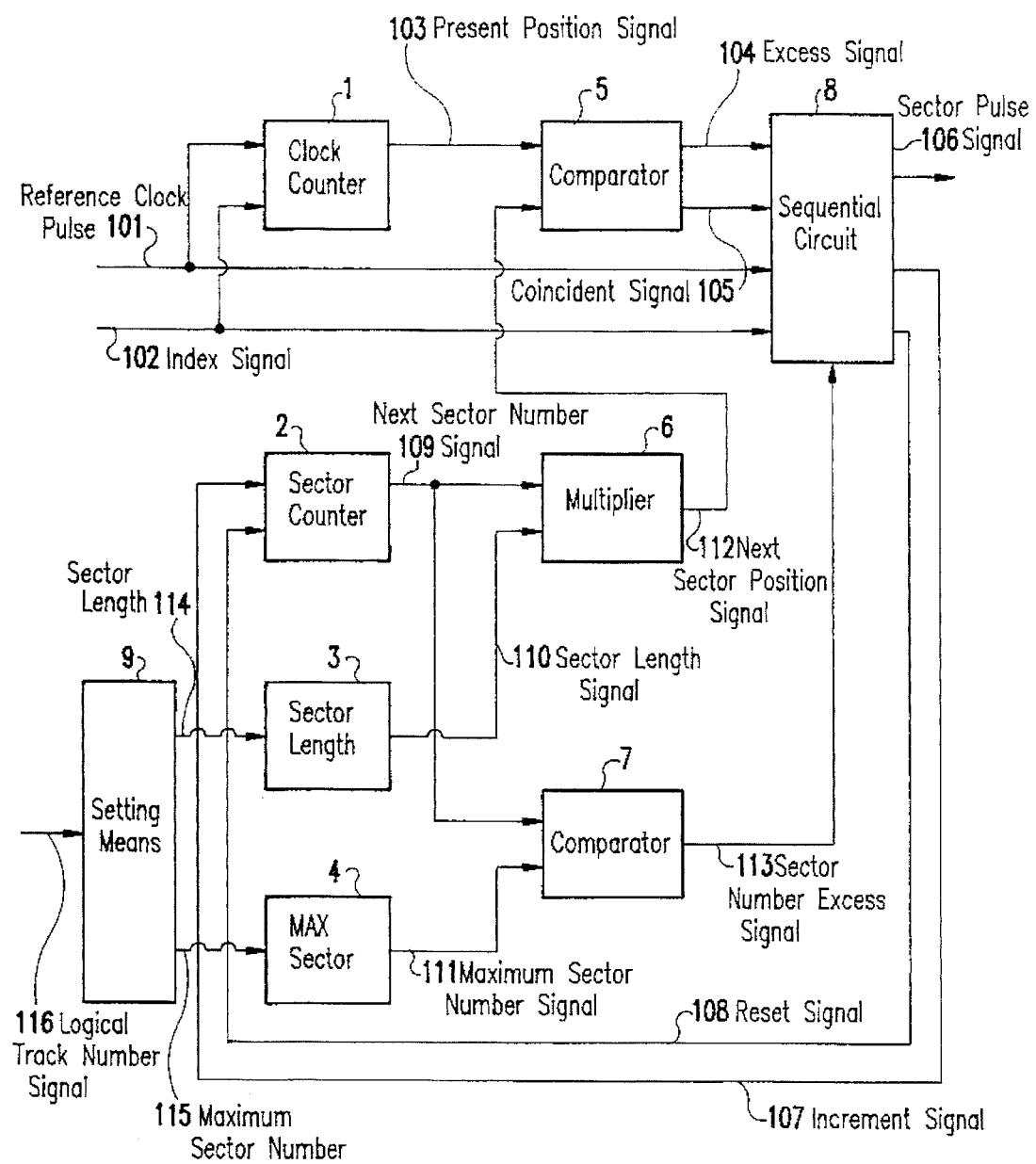
FIG. 2 is a block diagram of a sector pulse generating apparatus according to the present invention.

Referring to FIG. 2, a sector signal generating apparatus according to the present invention receives reference clock pulses 101, an index signal 102 and a logical track number signal 116, and outputs a sector pulse signal 106.

A clock counter 1 receives the reference clock signal pulses 101 and counts reference clock pulses 101. The clock counter 1 is reset to zero when the index signal 102 goes active. The clock counter 1 outputs a present position signal 103 that indicates the count value thereof (hereinafter referred to as "present position"). The present position signal 103 represents the present position of a recording/reproducing head relative to the disk memory.

A sector counter 2 receives an increment signal 107 and a reset signal 108. The sector counter 2 is incremented by 1 when the increment signal 107 goes active. The sector counter 2 is reset to zero when the reset signal 108 goes active. The sector counter 2 outputs a next sector number signal 109 that indicates the count value thereof (hereinafter referred to as a "next sector number"). The next sector number signal 109 represents the sector number of the next sector.

A rewritable sector length register 3 stores a number representing the sector length of the zone in which the head is located. When the head is moved across a zone boundary, the contents of the sector length register 3 is updated (e.g., rewritten). The sector length register 3 outputs sector length signal 110 that indicates the number stored currently therein.

A multiplier 6 receives the next sector number signal 109 and the sector length signal 110. The multiplier 6 multiplies the numbers stored in the sector counter 2 and the sector length register 3 and the result (hereinafter referred to as a "next sector position") is output as a next sector position signal 112. The next sector position signal 112 represents the position of the start of the next sector.

A comparator 5 receives the present position signal 103 and the next sector position signal 112, and outputs an excess signal 104 and a coincident signal 105. The comparator 5 compares the magnitude of the present position and the next sector position. If the next sector position is greater than the present position, the comparator 5 set the excess signal 104 to an active state. If the present position is equal to the next sector position, the comparator 5 set the coincident signal 105 to the active state. The excess signal 104 indicates that the head has not reached the next sector (e.g., has not crossed the inter-sector boundary). The coincident signal 105 indicates that the head has reached the next sector.

If the excess signal 104 and the coincident signal 105 are in the inactive state, the sector counter 2 stores a next sector number and an adjustment operation is necessary.

A rewritable maximum sector number register 4 stores the maximum sector number of the zone in which the head is located. When the head is moved into another zone, the contents of the maximum sector number register 4 is updated. The maximum sector number register 4 outputs a maximum sector number signal 111 representing the maximum sector number stored therein.

A comparator 7 receives the next sector number signal 109 and the maximum sector number.signal 111, and outputs a sector number excess signal 1130 If the next sector number stored in the sector counter 2 is greater than or equal to the maximum sector number stored in the maximum sector number register 4, the comparator 7 sets the sector number excess signal 113 to the active state. The sector number excess signal 113 indicates that the next sector number stored in the sector counter 2 exceeds the number of sectors actually included in the zone. In this case, the sector register 2 needs an adjustment operation.

A setting means 9 (e.g. such as a processor) receives a logical track number 116 from an external source (e.g., a processor or a computer). The setting means 9 converts the logical track number to a physical track number and determines the zone including the track indicated by the physical track number. Thereafter, the setting means 9 stores the sector length and the maximum sector number of the zone into the sector length register 3 and the maximum sector number register 4, respectively.

A sequential circuit 8 receives the reference clock pulse 101, the index signal 102, the excess signal 104, the coincident signal 105 and the sector number excess signal 113, and outputs a sector pulse signal 106, the reset signal 108 and the increment signal 107 according to the received signals. The detailed structure of the sequential circuit 8 is described below.

Figure 3:
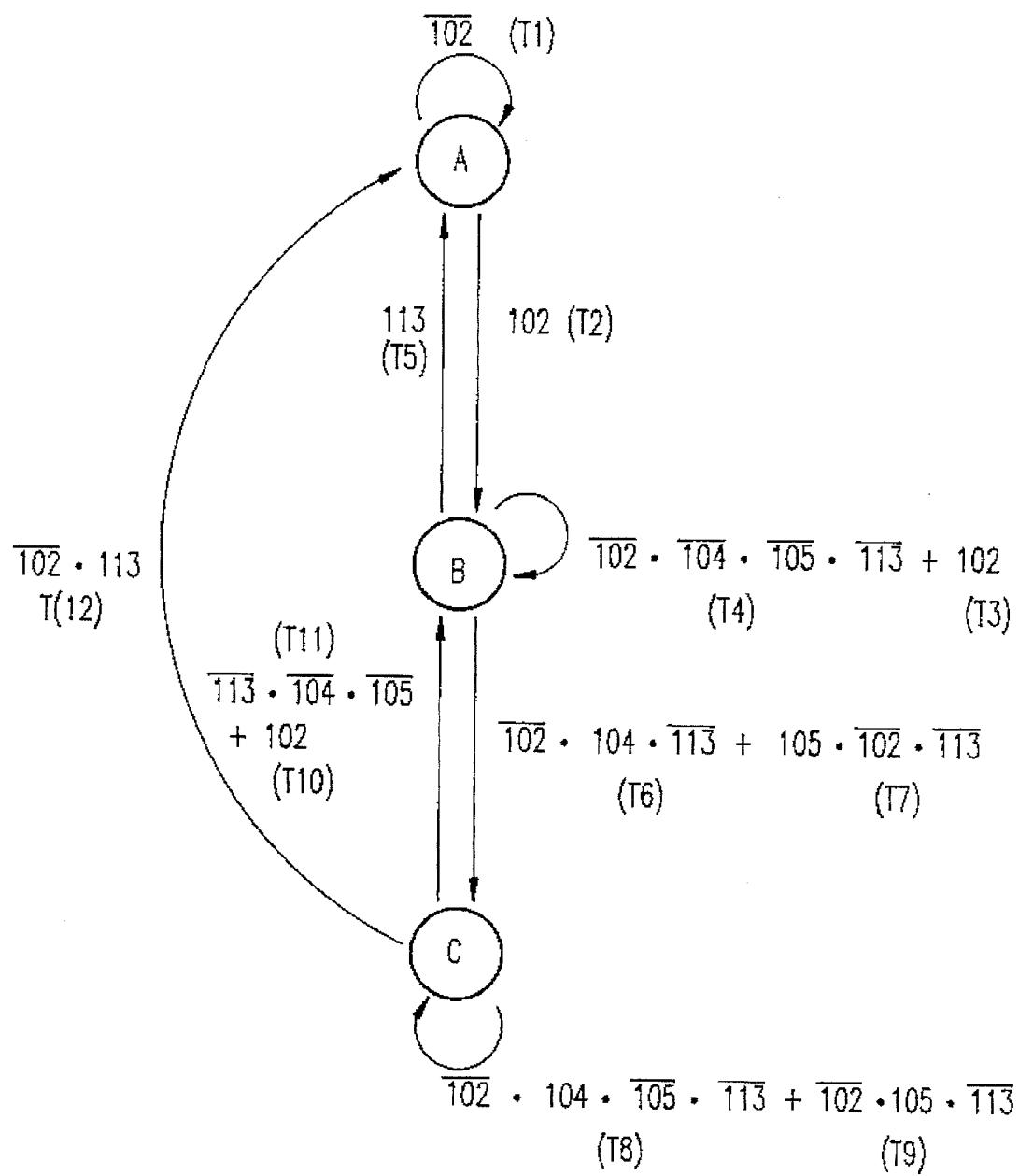
FIG. 3 is a state transition diagram of a sequential circuit 8 shown in FIG. 1.

Referring to FIG. 3, the sequential circuit 8 has a plurality of (e.g., three) states e.g., state A, state B and state C).

The sequential circuit 8 is initially set to state A. The sequential circuit 8 remains in state A until the index signal 102 goes active (Transition 1 (T1)). When the index signal 102 goes active, the sequential circuit 8 goes into state B (T2).

The sequential circuit 8 remains in state B when the index signal 102 is active (T3), or when all of the index signal 102, the excess signal 104, the coincident signal 105 and the sector number excess signal 113 are inactive (T4). The sequential circuit 8 resumes state A when the sector number excess signal 113 goes active (T5). The sequential circuit 8 goes to state C when the index signal 102 is inactive, the excess signal 104 is active, and the sector number excess signal 113 is inactive (T6). The sequential circuit 8 also goes to state C when the coincident signal 105 is active, the index signal 102 is inactive, and the maximum sector number signal 113 is inactive (T7).

The sequential circuit 8 remains in state C when the index signal 102 is inactive, the excess signal 104 is active, the coincident signal 105 is inactive, and the sector number excess signal 113 is inactive (T8). The sequential circuit 8 also remains in state C when the index signal 102 is inactive, the coincident signal 105 is active, and the sector number excess signal 113 is inactive (T9). The sequential circuit 8 goes to state B when the index signal 102 is active (T10), or the sector number excess signal 113, the excess signal 104 and the coincident signal 105 are all inactive (T11). The sequential circuit 8 goes to state A when the index signal 102 is inactive and the sector number excess signal 113 is active (T12).

Referring to FIG. 4, in state A, the sequential circuit 8 sets the reset signal 108 to the active state.

In state B, when the index signal 102 is active, the sequential circuit 8 sets the reset signal 108 to the active state. When the index signal 102 and the excess signal 104 are inactive, the sequential circuit 8 sets the increment signal 107 to the active state. When the index signal 102 is inactive and the excess signal 104 is active, the sector pulse signal 106, the increment signal 107 and the reset signal 108 are set to an inactive state.

In state C, when the index signal 102 is active, the sequential circuit 8 sets the reset signal 108 to an active state. When the index signal 102, the excess signal 104 and the coincident signal 105 are in the inactive, active and inactive states, respectively, the sector pulse signal 106, the increment signal 107 and the reset signal 108 are set to the inactive state. When the index signal 102 is inactive and the coincident signal 105 is active, the sector pulse signal 106, the increment signal 107 and the reset signal 108 are set to active, active and inactive states, respectively. When the index signal 102, the excess signal 104 and the coincident signal 105 are inactive, the sector pulse signal 106, the increment signal 107 and the reset signal 108 are set to the inactive, active and inactive states, respectively.

Next is described the operation of this embodiment referring to exemplary operations.

Figure 5A:
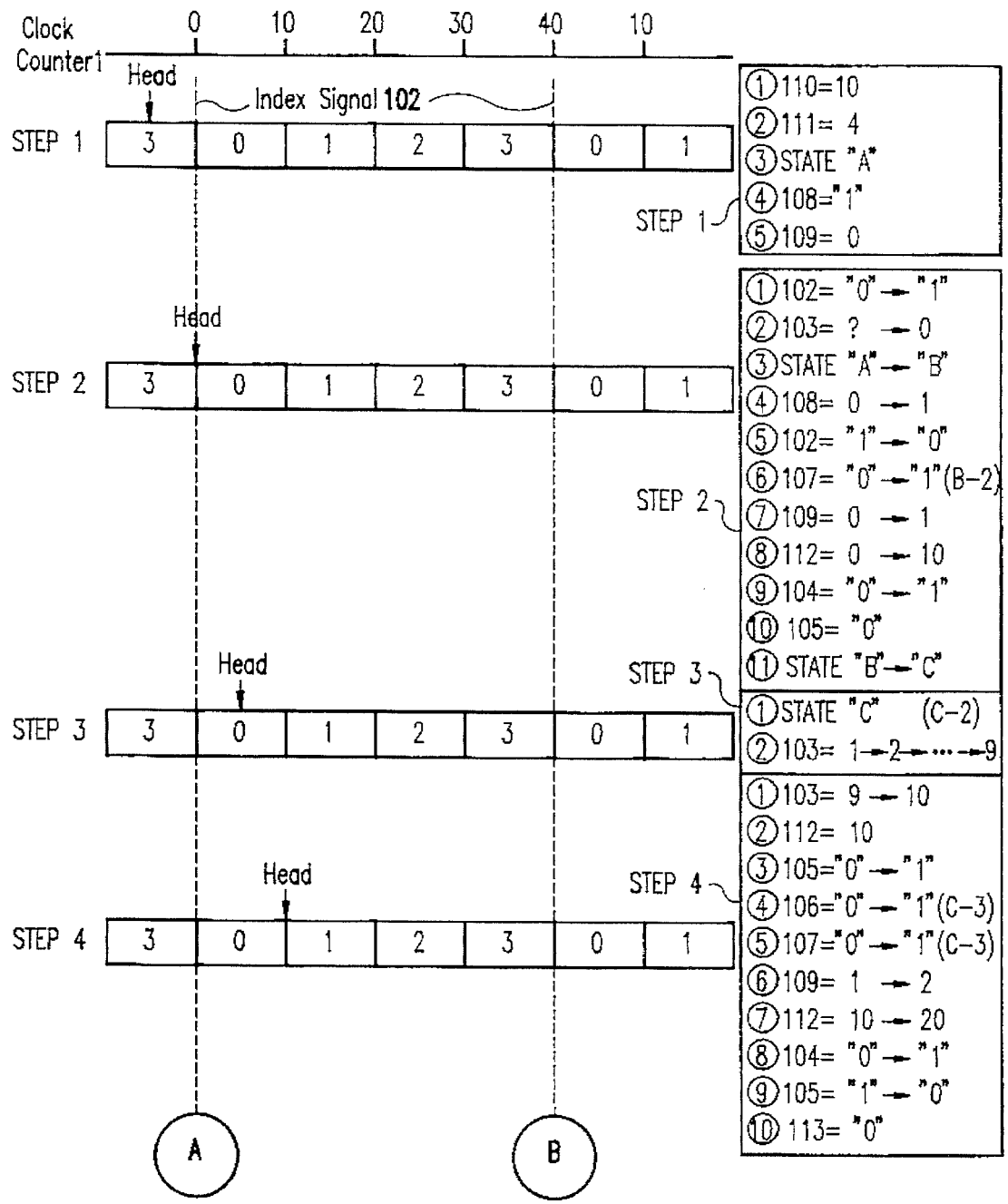
FIG. 5A and 5B show a first exemplary operation of the sector pulse generating apparatus of the present invention in which a head stays in a zone.
Figure 5B:
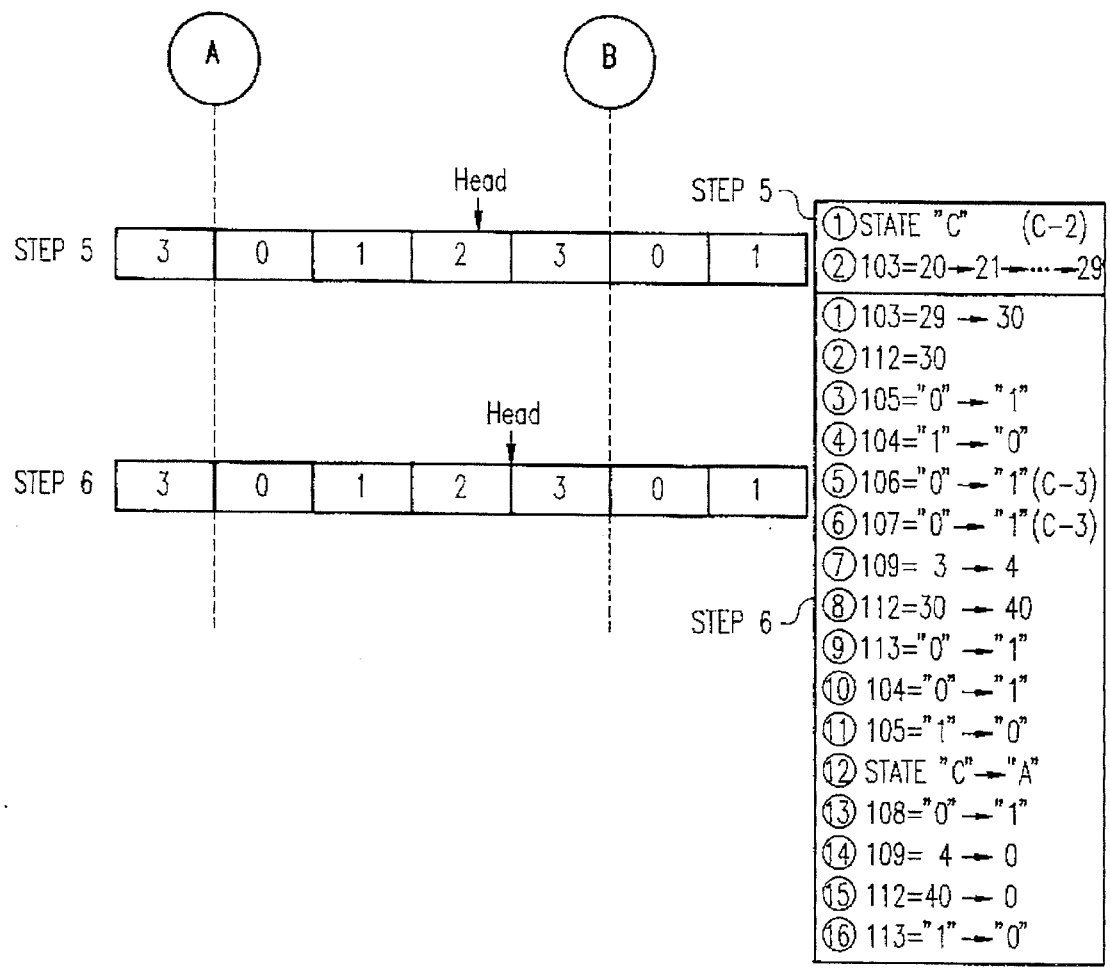
Figure 6:
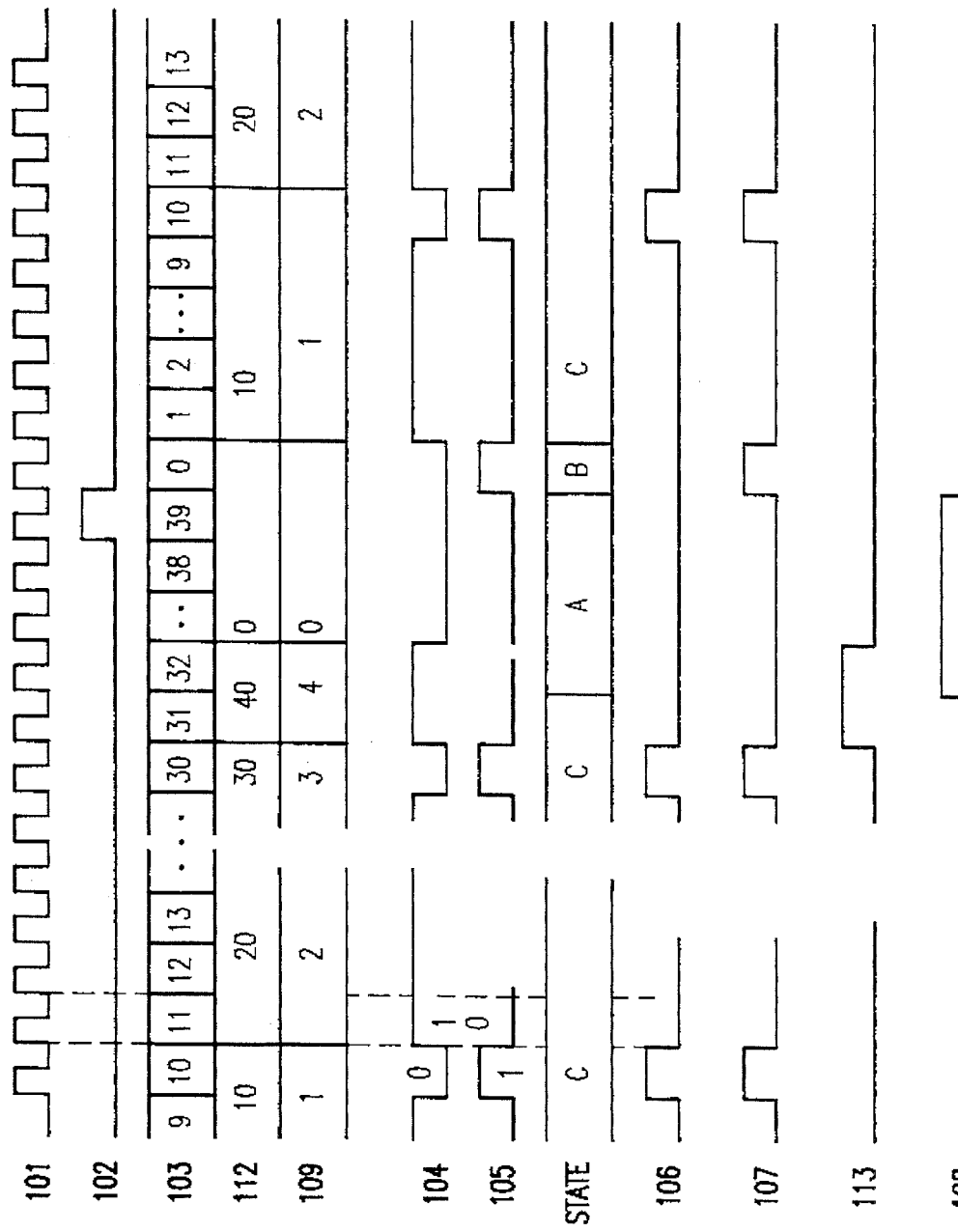
FIG. 6 shows the state of signals in the first exemplary operation shown in FIGS. 5A, 5B.

Referring to FIGS. 5A, 5B and 6, in a first exemplary operation, the head remains in a zone, and the sector length register 3 and the maximum sector number register 4 are not rewritten. The sector length and the maximum sector number of the zone are 10 and 4, respectively. That is, a track includes 4 sectors (e.g., sector 0 to sector 3) in this zone. Of course, the sector length and the maximum sector number may be set to other values.

In step 1, the head is located in sector 3. The sector length signal 110 is set to 10 (step 1-1). The maximum sector number signal 111 is set to 4 (step 1-2). The sequential circuit 8 is set in the initial state A (step 1-3). Referring to FIG. 4, the reset signal 108 is set to the active state (step 1-4). The next sector number signal 109 is set to 0 because the sector counter 2 is reset to 0 in response to the active reset signal 108 (step 1-5).

In step 2, as the disk memory is rotated, the head reaches the start of sector 0. The index signal 102 goes active (step 2-1). In response to the active index signal 102, the clock counter 1 is reset to 0 and the present position signal 103 is set to 0 (step 2-2). Referring to FIG.3, the sequential circuit 8 goes to state B (step 2-3). Referring to FIG. 4 (B-1), the reset signal 108 remains in the inactive state (step 2-4). After a predetermined time, the index signal 102 goes inactive (step 2-5). Referring to FIG. 4 (B-2), the increment signal 107 and the reset signal 108 are set to the active and inactive states, respectively (step 2-6). In response to the increment signal 108, the sector counter 2 is incremented by 1 and the next sector number signal 109 is set to 1 (step 2-7). The next sector position signal 112 is set to 1×10=10 (step 2-8). The excess signal 104 and the coincident signal 105 are set to the active and inactive states, respectively, because the next sector position signal 112 (=10) is greater than the present position signal 103 (=0) (steps 2-9 and 2-10). Referring to FIG. 3 (T6), the sequential circuit 8 goes to state C (step 2-11).

In step 3, referring to FIG. 3 (T8), the sequential circuit 8 remains in state C (step 3-1) until the excess signal 104 goes inactive (step 3-2).

In step 4, the clock counter 1 is incremented to 10 and the present position signal 103 is set to 10 (step 4-1). The next sector position signal 112 remains 10 (steps 4-2 and 2-8). The excess signal 104 and the coincident signal 105 are set to the inactive and active states, respectively, because the present position signal 103 (=10) is equal to the next sector position signal 112 (=10) (step 4-3). Referring to FIG. 4 (C-3), the sector pulse Signal 106 is set to the active state to generate a sector pulse (step 4-4). Simultaneously, the increment signal 107 is set to the active state (step 4-5). In response to the active increment signal 107, the sector counter 2 is incremented by 1 and the next sector number signal 109 is set to 2 (step 46). The next sector position signal 112 is set to 2×10=20 (step 4-7). The excess signal 104 and the coincident signal 105 are set to the active and inactive states, respectively, because the next sector position signal 112 (=20) is greater than the present position signal 103 (=10) (steps 4-8 and 4-9). The sector number excess signal 113 remains in the inactive state because the maximum sector number signal 111 (=4) is greater than the next number sector number 109 (=2) (step 4-10).

When the head reaches the start of the sector 2, the apparatus executes the same operation as step 4.

In step 5, referring to FIG. 3 (T8), the sequential circuit 8 remains in state C (step 3-1) until the value of the clock counter 1 reaches 30 (step 3-2).

In step 6, the value of the clock counter 1 reaches 30 (step 6-1). At this moment, the next sector position signal 112 is 30 (step 6-2). The coincident signal 105 and the excess signal 104 are set to the active and inactive states, respectively, because the present position signal 103 (=10) is equal to the next sector position signal 112 (=10) (step 6-3 and 6-4). Referring to FIG. 4 (C-3), the sector pulse signal 106 is set to the active state to generate a sector pulse (step 6-5). Simultaneously, the increment signal 107 is set to the active state (step 6-6). In response to the increment signal 107, the sector counter 2 is incremented by 1 and the next sector number signal 109 is set to 4 (step 6-7). The next sector position signal 112 is set to 4 ×10=40 (step 6-8). The sector number excess signal 113 is set to the active state because the next sector number signal 109 (=4) is equal to the maximum sector number signal 111 (=4) (step 6-9). The excess signal 104 and the coincident signal 105 are set to the active and inactive states, respectively, because the next sector position signal 112 (=40) is greater than the present position signal 103 (=30) (steps 6-10 and 6-11). Referring to FIG. 3 (T12), the sequential circuit 8 goes to state A (step 6-12). Referring to FIG. 4, the reset signal 108 is set to the active state (step 6-13). In response to the reset signal 108, the sector counter 2 is reset to 0 and the next sector number signal 109 is set to 0 (step 6-14). The next sector position signal 112 is set to 0×10=0 (step 6-15). The sector number excess signal 113 is set to the inactive state because the maximum sector number signal 111 (=4) is greater than the next sector number signal 109 (=0) (step 6- 16).

After step 6, the apparatus is brought into the same state as that of the apparatus just before step 2 and the apparatus repeats the same operation of steps 2 to 6. Thus, the apparatus generates a sector pulse at every start of the sectors.

Figure 7:
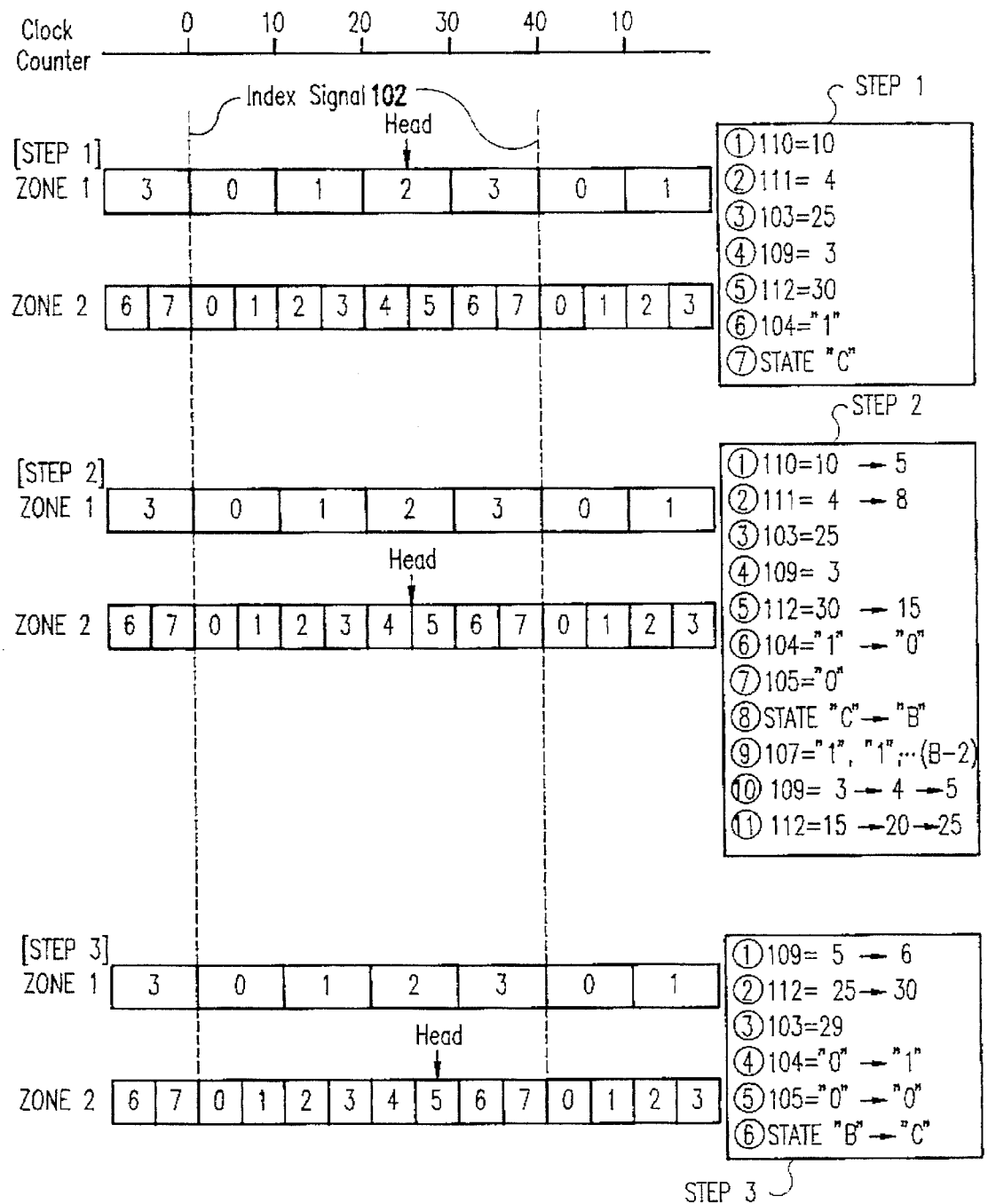
FIG. 7 shows a second exemplary operation of the sector pulse generating apparatus of the present invention in which the head is moved from a small zone to a large zone.
Figure 8:
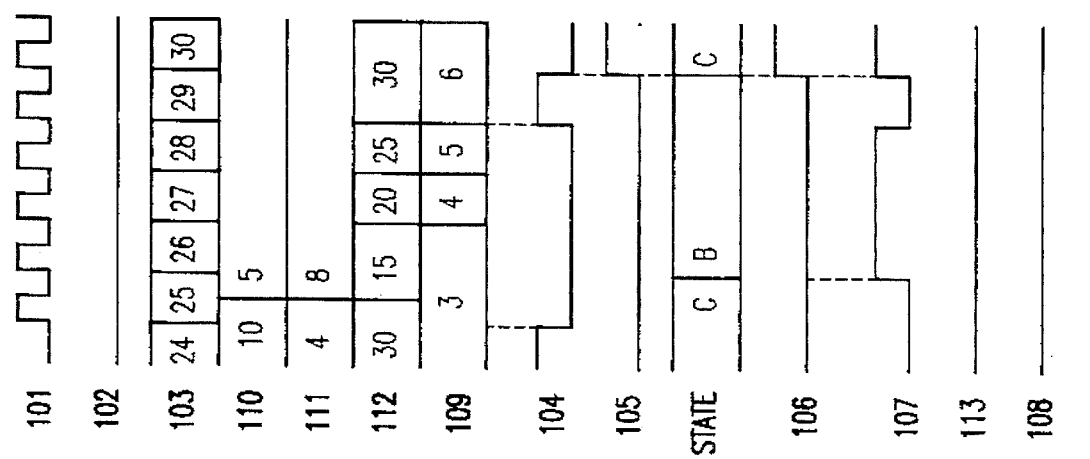
FIG. 8 shows the state of signals in the second exemplary operation shown in FIG. 7.

Referring to FIGS. 7 and 8, in a second exemplary operation, the head is moved from a zone 1 into a zone 2. The setting means 9 updates the contents of the sector length register 3 and the maximum sector number register 4 when the head is moved. The sector length and the maximum sector number of zone 1 are 10 and 4, respectively. The sector length and the maximum sector number of zone 2 are 5 and 8, respectively. A track includes 4 and 8 sectors in zone 1 and zone 2, respectively.

In step 1, the head is located in sector 2 of a track in zone 1. The sector length register 3 and the sector length signal 110 are set to the sector length of zone 1 (=10) (step 1-1). The maximum sector number register 4 and the maximum sector number signal 111 are set to the maximum sector number of zone 1 (=4) (step 1-2). The values of the clock counter 1 and the present position signal 103 are, for example, 25 (step 1-3). The values of sector counter 2 and the next sector number signal 109 are 3 (step 1-4). The value of the next sector position signal 112 is 10×3=30 (step 1-5). The excess signal 104 is active because the next sector position signal 112 (=30) is greater than the present position signal 103 (=25) (step 1-6). The sequential circuit 8 is in state C (step 1-7).

In step 2, the head is moved from zone 1 to zone 2. In response to the head movement, the setting means 9 stores the sector length of zone 2 (=5) and the maximum sector number of zone 2 (=8) into the sector length register 3 and the maximum sector number register 4, respectively (steps 2-1 and 2-2).

The value of the sector counter 2 and the next sector number signal 109 remains 25 (step 2-3). The value of the sector counter 2 and the next sector signal 109 remains 3 (step 2-4). The value of the next sector position signal 112 is set to 5×3=15 (step 2-5). The excess signal 104 and the coincident signal 105 are set to the inactive state because the present position signal 103 (=25) is greater than the next sector position signal 112 (=15) (step 2-6 and 2-7).

This signal state indicates that the next sector number stored in the sector counter 2 (=sector 3 in the zone 1) does not indicate the correct next sector number (= sector 6 in the zone 2). In response to this situation, the sequential circuit 8 starts an adjustment operation.

Referring to FIG. 3 (T11), the sequential circuit 8 goes to state B (step 2-8). Referring to FIG. 4 (B-2 and B-3), the sequential circuit 8 maintains the increment signal in the active state until the excess signal 104 goes active (step 2-9). In response to the increment signal 107, the next sector number signal 109 and the next sector position signal 112 are continuously incremented by 1 and 5, respectively, until the excess signal 104 goes active (step 2-10).

In step 3, the next sector number signal 109 and the next sector signal 112 are incremented to 6 and 30, respectively (steps 3-1 and 3-2). The clock counter 1 and the present position signal 103 are incremented to 29 (step 3-3). The excess signal 104 and the coincident signal 105 go active ad inactive, respectively, because the next sector position signal 112 (=30) is greater than the present position signal 103 (=29) (step 3-4 and 3-5). Referring to FIG. 3 (T6), the sequential circuit 8 goes to state C (step 3-6).

Thus, the value of the sector counter 2 is adjusted to the correct next sector number (=6). After this adjustment, the apparatus repeats the operations corresponding to steps 2 to 6 shown in FIGS. 5A and 5B, respectively.

Figure 9:
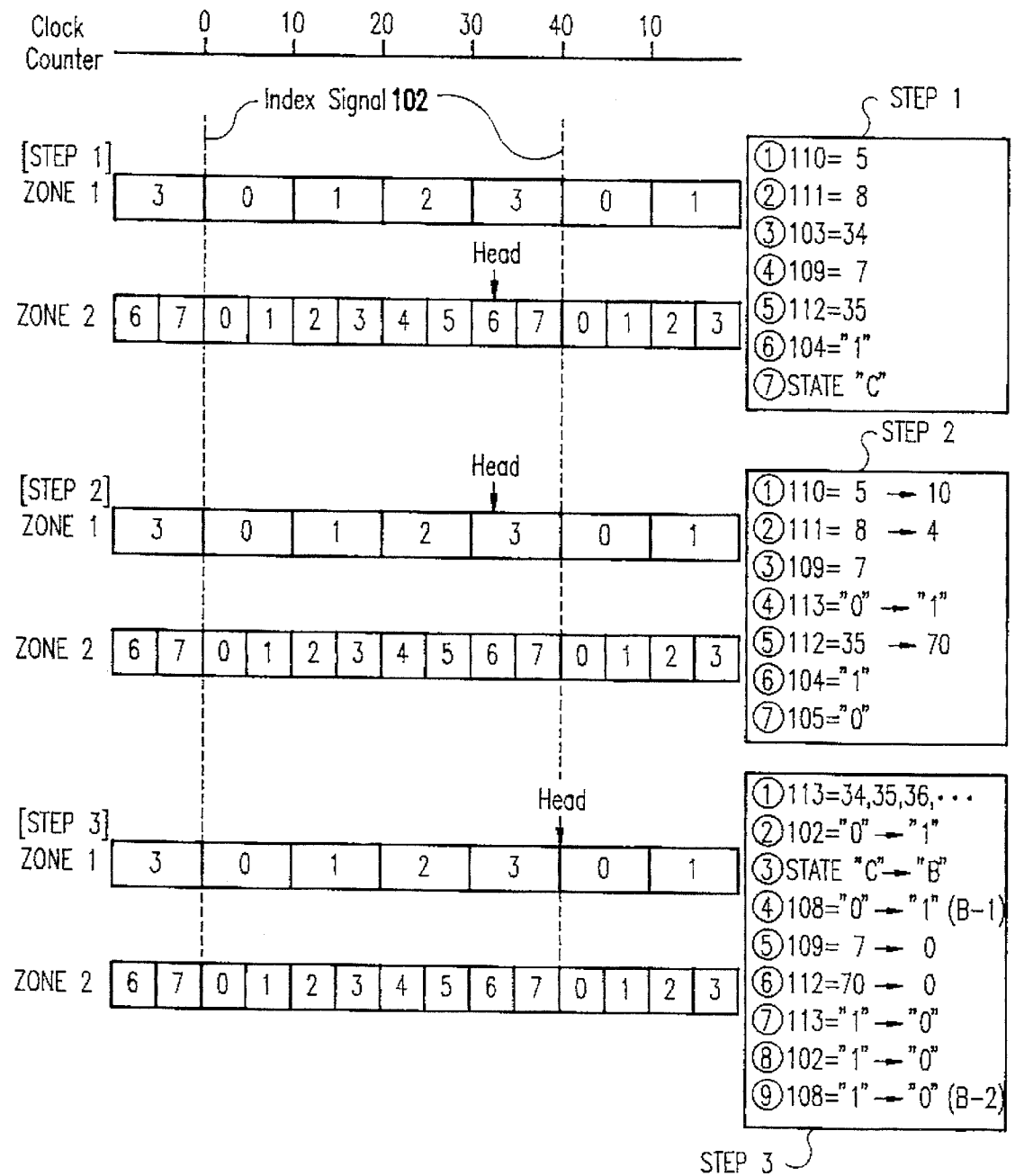
FIG. 9 shows a third exemplary operation of the sector pulse generating apparatus of the present invention in which the head is moved from a large zone to a small zone.
Figure 10:
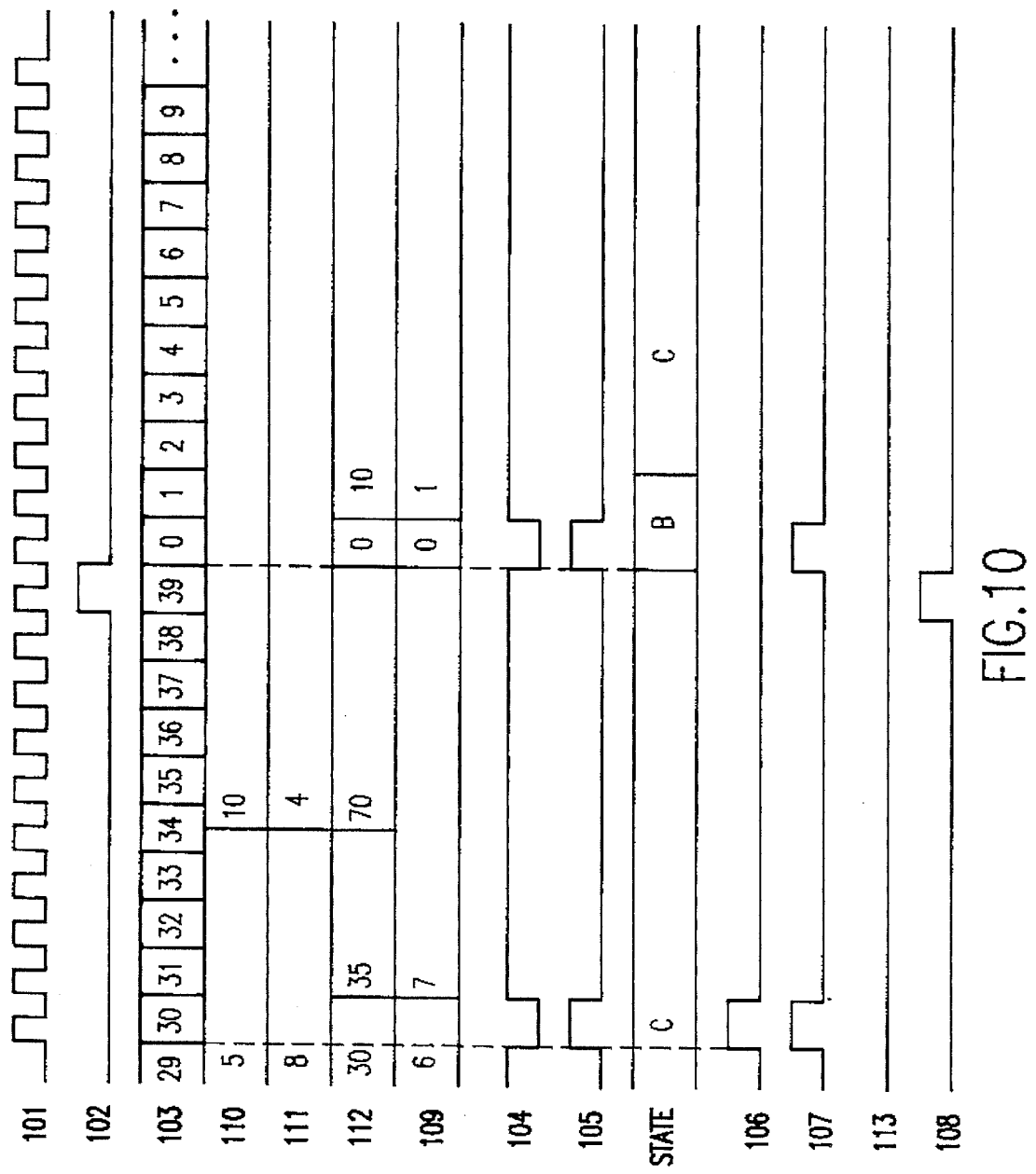
FIG. 10 shows the state of signals in the third exemplary operation shown in FIG. 9.

Referring to FIGS. 9 and 10, in a third exemplary operation, the head is moved from zone 2 to zone 1.

In step 1, the head is located in sector 6 of a track in zone 2. The sector length register 3 and the secor length signal 110 are set to the sector length of zone 2 (=5) (step 1-1). The maximum sector number register 4 and the maximum sector number signal 111 are set to the maximum sector number of zone 2 (=8) (step 1-2). The values of the clock counter 1 and the present position signal 103 are, for example, 34 (step 1-3). The values of the sector counter 2 and the next sector number signal 109 are 7 (step 1-4). The value of the next sector position signal 112 is 5×7=35 (step 1-5). The excess signal 104 is active because the next sector position signal 112 (=35) is greater than the present position signal 103 (=34) (step 1-6). The sequential circuit 8 is in state C (step 1-7).

In step 2, the head is moved from zone 2 to zone 1. In response to the head movement, the setting means 9 stores the sector length of zone 1 (=10) and the maximum sector number of zone 1 (=4) into the sector length register 3 and the maximum sector number register 4, respectively, (steps 2-1 and 2-2). The values of the sector counter 2 and the next sector number signal 109 remain 7 (step 2-3). The sector number excess signal 113 goes active because the next sector number signal 109 (=7) is greater than the maximum sector number signal 111 (=4) (step 2-4).

This signal state indicates that the sector counter 2 does not store the correct next sector number (=sector 0 in zone 1). Therefore, the sequential circuit 8 executes a following adjustment operation.

The value of the next sector position signal 112 is set to 10×7=70 (step 2-5). The excess signal 104 and the coincident signal 105 go active and inactive, respectively, because the next sector position signal 112 (=70) is greater than the present position signal 103 (=34) (step 2-6 and 2-7).

In step 3, the value of the present position signal 103 is incremented continuously (step 3-1). As the disk memory rotates, the head returns to the start of sector 0 at last and the index signal 102 goes active (step 3-2). Referring to FIG. 3 (T10), the sequential circuit 8 goes to state B (step 3-3). Referring to FIG. 4 (B-1), the reset signal 108 goes active (step 3-4). In response to the active reset signal 108, the sector counter 2, the next sector number signal 109, and the next sector position signal 112 are reset to 0 (steps 3-5 and 3-6). The sector number excess signal 113 goes inactive because the next sector number signal 109 (=0) is smaller than the maximum sector number signal 111 (=4) (step 3-7). After a while, the index signal 102 goes inactive (step 3-8). Referring to FIG. 4 (B-2), the reset signal goes inactive (step 3-9).

Thus, the value of the sector counter 2 is adjusted to the correct next sector number (=0) by suspending the generation of the sector pulses until the index signal 102 arrives. After this adjustment, the apparatus repeats the operations corresponding to steps 2 to 6 shown in FIGS. 5A and 5B respectively.

Figure 11:
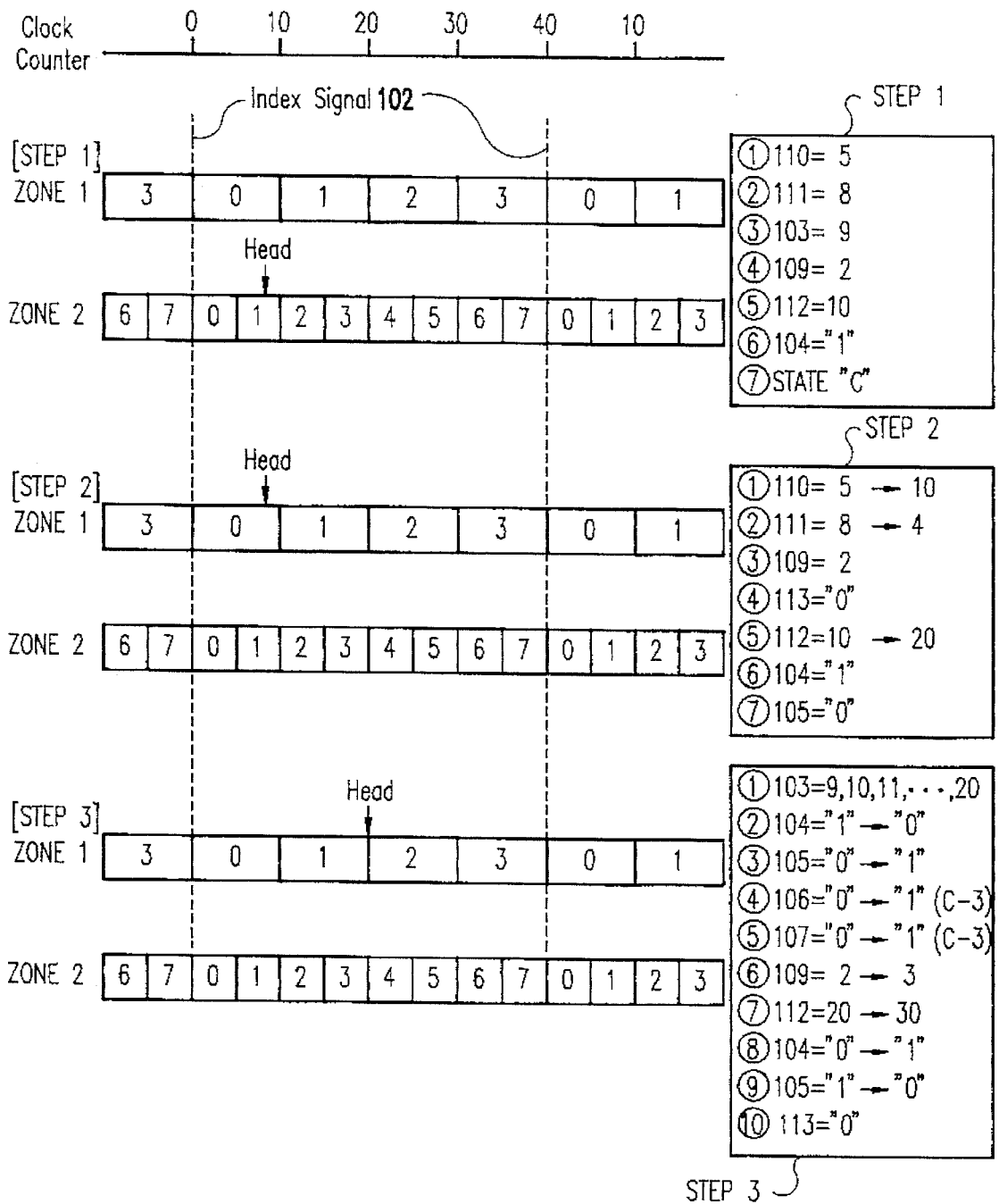
FIG. 11 shows a fourth exemplary operation of the sector pulse generating apparatus of the present invention in which the head is moved from a large zone to a small zone.

Referring to FIG. 11, in a fourth exemplary operation, the head is moved from zone 2 to zone 1. Unlike the third exemplary operation, the adjustment of the sector counter 2 is started before the apparatus receives the index signal 102.

In step 1, the head is located in sector 1 of a track in zone 2. The sector length register 3 and the sector length signal 110 are set to the sector length of zone 2 (=5) (step 1-1). The maximum sector number register 4 and the maximum sector number signal 111 are set to the maximum sector number of zone 2 (=8) (step 1-2). The value of the clock counter 1 and the present position signal 103 are, for example, 9 (step 1-3). The value of the sector counter 2 and the next sector number signal 109 are 2 (step 1-4). The value of the next sector position signal 112 is 2×5=10 (step 1-5). The excess signal 104 is active because the next sector position signal 112 (=10) is greater than the present position signal 103 (=9) (step 1-6). The sequential circuit 8 is in state C (step 1-7).

In step 2, the head is moved from zone 2 to zone 1. In response to the head movement, the setting means 9 stores the sector length of zone 1 (=10) and the maximum sector number of zone 1 (=4) into the sector length register 3 and the maximum sector number register 4, respectively (steps 2-1 and 2-2). The values of the sector counter 2 and the next sector number signal 109 remain 2 (step 2-3). The sector number excess signal 113 remains in the inactive state because the next sector number signal 109 (=2) is smaller than the maximum sector number signal 111 (=4) (step 2-4).

In this situation, the value of the sector counter 2 (=2) is not the correct next sector number (=1). Therefore, the sequential circuit 8 executes the following adjustment operation.

The value of the next sector position signal 112 is set to 10×2=20 (step 2-5). The excess signal 104 and the coincident signal 105 go active and inactive, respectively, because the next sector position signal 112 (=70) is greater than the present position signal 103 (=34) (steps 2-6 and 2-7).

In step 3, the value of the present position signal 103 is incremented continuously to 20 (step 3-1). The excess signal 104 and the coincident signal 105 go inactive and active, respectively, because the present position signal 103 (=20) is equal to the next sector position signal 112 (=20) (steps 3-2 and 3-3). Referring to FIG. 4 (C-3), the sector pulse signal 106 goes active to generate a sector pulse (step 3-4). Simultaneously, the increment signal 107 goes active (step 3-5). In response to the increment signal 109, the next sector number signal 109 and the next sector position signal 112 are incremented to 3 and 30, respectively (steps 3-6 and 3-7). The excess signal 104 and the coincident signal 105 go active and inactive, respectively, because the next sector position signal 112 (=30) is greater than the present position signal 103 (=20) (steps 3-8 and 3-9). The sector number excess signal 113 remains 0 (step 3-10).

Thus, the value of the sector counter 2 is adjusted to the correct next sector number (=3) by suspending the generation of sector pulses until the value of the clock counter 1 catches up with the value of the next sector position signal 112. After this adjustment, the apparatus is in a state corresponding to step 4 shown in FIG. 5A. Therefore, the apparatus goes into the cycle of steps 2 to 6 shown in FIGS. 5A and 5B, respectively.

As stated above, a sector pulse generating apparatus according to the present invention can generate sector pulses with only two counters (i.e., the clock counter 1 and the sector counter 2) irrespective of the number of zones of the disk memory. The apparatus starts the generation of the sector pulse immediately after the movement of the head in the second and fourth exemplary operations. Furthermore, the apparatus automatically adjusts the value of the sector counter 2 after the movement of the head.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A sector pulse generating apparatus for multiple zone recording, said apparatus receiving reference clock pulses and outputting a sector pulse, said apparatus comprising:

a first counter for receiving and counting said reference clock pulses, said first counter outputting a first signal representing a first count value thereof;

a second counter for receiving an increment signal and being incremented in response to said increment signal, said second counter outputting a second signal representing a second count value thereof;

a first register for storing a first number and outputting a third signal representing said first number;

a multiplier for receiving said second and third signals and outputting a fourth signal representative of a multiplication of numbers represented by said second and third signals;

a first comparator for outputting a fifth signal according to a comparison of a magnitude of numbers represented by said first and fourth signals;

first increment means for receiving said fifth signal and for outputting said increment signal when said fifth signal represents that numbers represented by said first and fourth signals match; and sector pulse generating means for receiving said fifth signal and for outputting said sector pulse when said fifth signal represents that numbers represented by said first and fourth signals match.

2. An apparatus according to claim 1, wherein said apparatus receives an index signal, and said first and second counters are reset in response to said index signal.

3. An apparatus according to claim 1, further comprising:

a second register for storing a second number and outputting a sixth signal representing said second number;

a second comparator for outputting a seventh signal according to a comparison of a magnitude of numbers represented by said second signal and said sixth signal; and reset means for receiving said seventh signal and for resetting said second counter when said seventh signal indicates that numbers represented by said second and sixth signals match.

4. An apparatus according to claim 1, further comprising adjustment means for adjusting said second count value of said second counter.

5. An apparatus according to claim 4, wherein said adjustment means comprises second increment means for receiving said fifth signal and for outputting said increment signal continuously while said fifth signal indicates that a number represented by said first signal is greater than a number represented by said fourth signal.

6. An apparatus according to claim 4, wherein said adjustment means comprises first suspension means for suspending a generation of said sector pulse until said index signal is output.

7. An apparatus according to claim 4, wherein said adjustment means comprises second suspension means for suspending a generation of said sector pulse until said fifth signal represents that numbers represented by said first and fourth signals match.

8. An apparatus according to claim 1, further comprising:

setting means receiving an eighth signal representing a track number for setting into said first register a sector length of a zone including a track indicated by said track number.

9. An apparatus according to claim 3, further comprising:

setting means for receiving an eighth signal representing a track number and for setting into said first and second registers a sector length and a maximum sector number of a zone including a track indicated by said track number, respectively.

10. An apparatus according to claim 1, wherein said first increment means and said sector pulse generating means are implemented by a sequential circuit.

11. An apparatus according to claim 3, wherein said first increment means, said sector pulse generating means, and said reset means are implemented by a sequential circuit.

12. An apparatus according to claim 4, wherein said first increment means, said sector pulse generating means, and said adjustment means are implemented by a sequential circuit.

13. An apparatus according to claim 1, wherein a number of said first and second counters remains fixed irrespective of a number of zones of said multiple zone recording.

14. An apparatus according to claim 1, wherein as a number of zones of said multiple zone recording increases, a structure of said sector pulse generating means remains fixed.

* * * * *